(12) United States Patent
Leffler

(10) Patent No.: US 12,538,881 B2
(45) Date of Patent: Feb. 3, 2026

(54) MAPLE TREE TAPPING TOOL

(71) Applicant: Zebulun Robert Leffler, Varysburg, NY (US)

(72) Inventor: Zebulun Robert Leffler, Varysburg, NY (US)

( * ) Notice: Subject to any disclaimer, the term of this patent is extended or adjusted under 35 U.S.C. 154(b) by 361 days.

(21) Appl. No.: 17/891,122

(22) Filed: Aug. 18, 2022

(65) Prior Publication Data

US 2024/0057533 A1 Feb. 22, 2024

(51) Int. Cl.
*A01G 23/10* (2006.01)

(52) U.S. Cl.
CPC .................... *A01G 23/10* (2013.01)

(58) Field of Classification Search
CPC ............................ A01G 23/10–14; A01G 7/06
USPC .............................................................. 47/12
See application file for complete search history.

(56) References Cited

U.S. PATENT DOCUMENTS

| | | | | |
|---|---|---|---|---|
| 2,501,036 A | * | 3/1950 | Fay ........................ | B23B 47/28 33/574 |
| 2,729,891 A | * | 1/1956 | Winter .................... | B25H 7/005 33/21.3 |
| 2,844,977 A | * | 7/1958 | Morse .................... | B23B 49/026 324/67 |
| 2,996,936 A | * | 8/1961 | Blaise .................... | B23B 47/28 408/72 R |
| 4,209,182 A | * | 6/1980 | Sheldon ................ | B23B 31/1071 279/75 |
| 9,669,473 B2 | * | 6/2017 | Ponton .................... | B23B 49/02 |
| 2015/0034209 A1 | * | 2/2015 | Davis ..................... | A01G 23/10 144/93.1 |
| 2015/0201567 A1 | * | 7/2015 | Branon .................. | A01G 23/12 279/145 |
| 2018/0049379 A1 | * | 2/2018 | Hu ......................... | A01G 23/14 |

FOREIGN PATENT DOCUMENTS

| | | | | |
|---|---|---|---|---|
| CN | 107065656 A | * | 8/2017 | ............. A01G 23/12 |
| CN | 110476771 A | * | 11/2019 | ............. A01G 23/12 |
| CN | 113439636 A | * | 9/2021 | |
| WO | WO-2012121586 A1 | * | 9/2012 | ............. A01G 23/10 |

* cited by examiner

*Primary Examiner* — Jack W Keith
*Assistant Examiner* — Hae Rie Jessica Byun
(74) *Attorney, Agent, or Firm* — Jong Patent Firm; Cheng Ning Jong; Tracy P. Jong

(57) ABSTRACT

A device configured to be adapted to a drill, the drill having a drill bit and the drill bit having a central axis, the device including an adjustable ring configured to be adapted to the drill, a front plate; a plurality of pins disposed on the front plate, each the plurality of pins including a tip; and a slide including a central axis, the front plate configured to be retractable to a first position and extendable to a second position, the adjustable ring is attached to the slide at a first portion of the slide and the front plate is attached to the slide at a second portion of the slide and a distance between the tip of each of the plurality of pins and the adjustable ring is configured to be adjustable by the slide along the central axis of the slide.

18 Claims, 11 Drawing Sheets

MAPLE TREE TAPPING TOOL

BACKGROUND OF THE INVENTION

1. The Field of the Invention

The present invention relates to a maple tree tapping tool. More specifically, the present invention is directed to a maple tree tapping tool adaptable to a ubiquitous hand-held drill.

2. Background Art

The tapping of a maple tree for its sap involves first creating an elongated hole so that a spout can be installed to facilitate collection of the sap. Severe reductions in sap production can occur if elongated holes are created without due care as air leaks can occur around spouts installed in these elongated holes. Therefore it is imperative that elongated holes with consistent diameters be created such that spouts can be fit tightly to eliminate air leaks which can lead to severe reduction in sap production.

There exists a need for a maple tree tapping tool that allows elongated holes with consistent diameters to be created and a maple tree tapping tool that does not get clogged up easily during use and can continue to service all trees of a maple tree farm without fail or without requiring cleaning, undue maintenance and/or repair.

SUMMARY OF THE INVENTION

In accordance with the present invention, there is provided a device configured to be adapted to a drill, the drill having a drill bit and the drill bit having a central axis, the device including:
(a) an adjustable ring configured to be adapted to the drill, the adjustable ring disposed at a proximal end of the device;
(b) a front plate disposed at a distal end of the device;
(c) a plurality of pins disposed on the front plate, each pin including a tip; and
(d) at least one slide including a central axis, the front plate configured to be retractable to a first position and extendable to a second position, the adjustable ring is attached to the at least one slide at a first portion of the at least one slide and the front plate is attached to the at least one slide at a second portion of the at least one slide and a distance between the tip of each pin and the adjustable ring is configured to be adjustable by the at least one slide along the central axis of the at least one slide,
wherein the adjustable ring is connected to the at least one slide such that the central axis of the drill bit is parallel to the central axis of the at least one slide and the central axis of the drill bit is not coaxial with the central axis of the at least one slide and at least one of the tips of the plurality of pins comes in contact with a surface before the drill is pushed against the surface to compress the at least one slide, guiding the drill bit against the surface.

In one embodiment, the adjustable ring is a split ring including an opening diameter configured to be adjustable by using a fastener. In one embodiment, the at least one slide includes at least two slides. In one embodiment, the at least one slide includes a cylinder. In one embodiment, the device further includes a lock configured for locking the at least one slide to substantially the first position. In one embodiment, the lock further includes a trigger disposed at a location of the device such that the lock is operable by a user while holding the drill. In one embodiment, the device includes a block configured to selectively block the front plate while the at least one slide is being retracted such that the front plate is configured to be retractable to a third position instead, wherein the third position is different from the first position. In one embodiment, the plurality of pins include at least three pins. In one embodiment, the at least one slide includes at least one spring-loaded slide. In one embodiment, at least one of the plurality of pins is configured to be adjustable with respect to the front plate. In one embodiment, the at least one slide includes a linear motion bearing. In one embodiment, the device further includes a paint marker configured to mark a portion of the surface at a moment the drill is pushed against the surface.

An object of the present invention is to provide a maple tree tapping tool that does not require an intermittent service activity due to clogging of the tool during use.

Another object of the present invention is to provide a maple tree tapping tool that can be adapted to a ubiquitous drill without requiring significant modifications of the drill.

Another object of the present invention is to provide a maple tree tapping tool that can be adapted to a ubiquitous drill while allowing the drill's intended purposes to be restored without undue effort.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
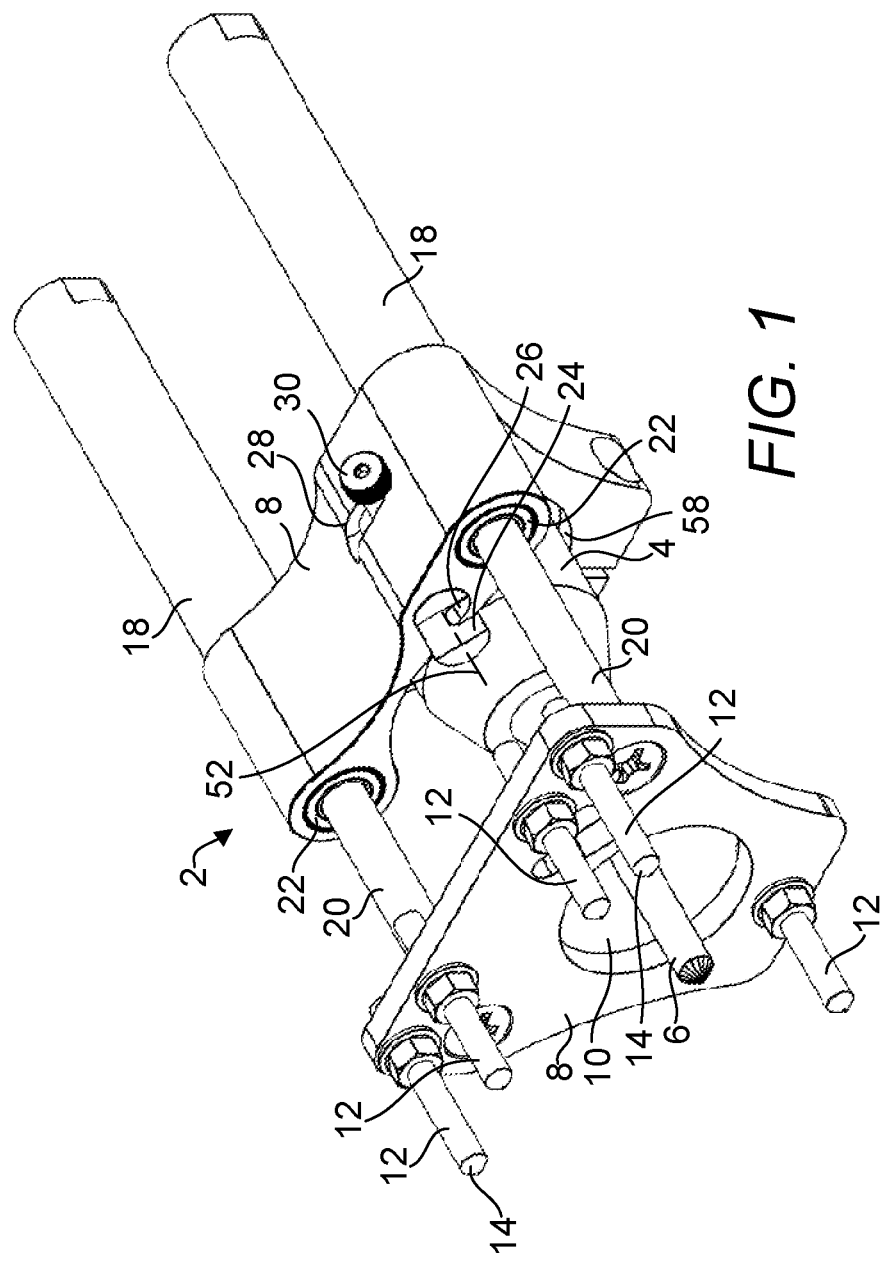
FIG. 1 is a top front perspective view of a device configured to be adaptable to a drill.

- 2—maple tree tapping tool or device
- 4—drill
- 6—drill bit
- 8—front plate
- 10—aperture
- 12—locator pin
- 14—point of locator pin
- 16—body or adjustable ring
- 18—slide, e.g., spring-loaded slide
- 20—rod
- 22—linear motion bearing
- 24—block
- 26—latch
- 28—slot
- 30—lever or trigger
- 32—fastener
- 34—paint marker
- 36—paint marking tip
- 38—spout separating or removal tool or device
- 40—shank
- 42—jaw or spreader
- 44—pivot point
- 46—hammer head
- 48—claw
- 50—spout or spile
- 52—central axis of block
- 54—central axis of drill bit
- 56—central axis of slide
- 58—opening
- 60—tree surface
- 62—drilled hole
- 64—direction in which drill is pressed against surface
- 66—first position of front plate relative to body
- 68—second position of front plate relative to body
- 70—third position of front plate relative to body
- 72—portion of front plate where latch can be engaged
- 74—opening
- 76—contour of tree trunk

PARTICULAR ADVANTAGES OF THE INVENTION

The present maple tree tapping tool is useful for allowing precise elongated holes to be drilled in maple trees, thereby enabling tapping of maple trees without fail, increasing the yield of maple trees as suitably drilled holes enable tapping of those trees for sap without fail.

The present maple tree tapping tool is simple in its design and does not require a concentrically-disposed frame or cage to allow a drill be guided towards a maple tree for it to be tapped. As such, the present maple tapping tool does not include a structure which tends to trap fibers as a result of drilling an elongated hole in a maple tree.

The present maple tree tapping tool can be adapted to a drill without requiring significant modifications to the drill, e.g., the removal of the drill chuck.

Often times, the size (or the trunk diameter) of a maple tree dictates the depth of a hole to be drilled for it to be tapped. The present maple tree tapping tool includes a drilling depth adjustment mechanism, thereby allowing a user to select the depth to which a hole is drilled. In one embodiment, the drilling depth adjustment mechanism doubles as a lock which holds the front plate of the tool and therefore any parts attached thereon, back to a position such that the tool, while attached to a drill, can allow the drill to be used for purposes other than maple tree tapping. Therefore, the present tool can be conveniently left attached to a drill for extended periods of time without jeopardizing the use of the drill for other purposes, e.g., the removal of a broken spout from a tree where the guiding feature offered by the device is unnecessary or undesirable.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 2:
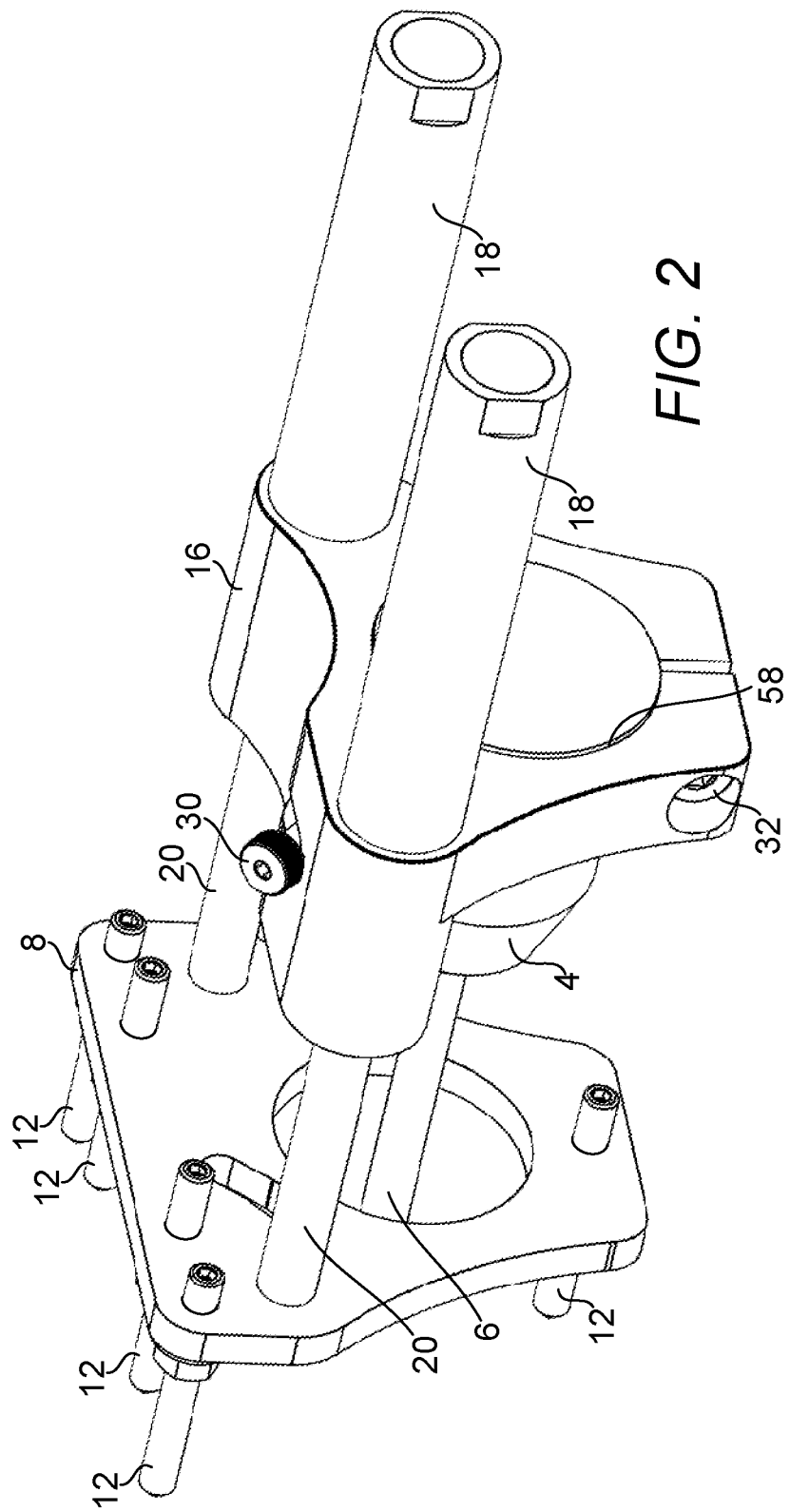
FIG. 2 is a top rear perspective view of a device configured to be adaptable to a drill.
Figure 3:
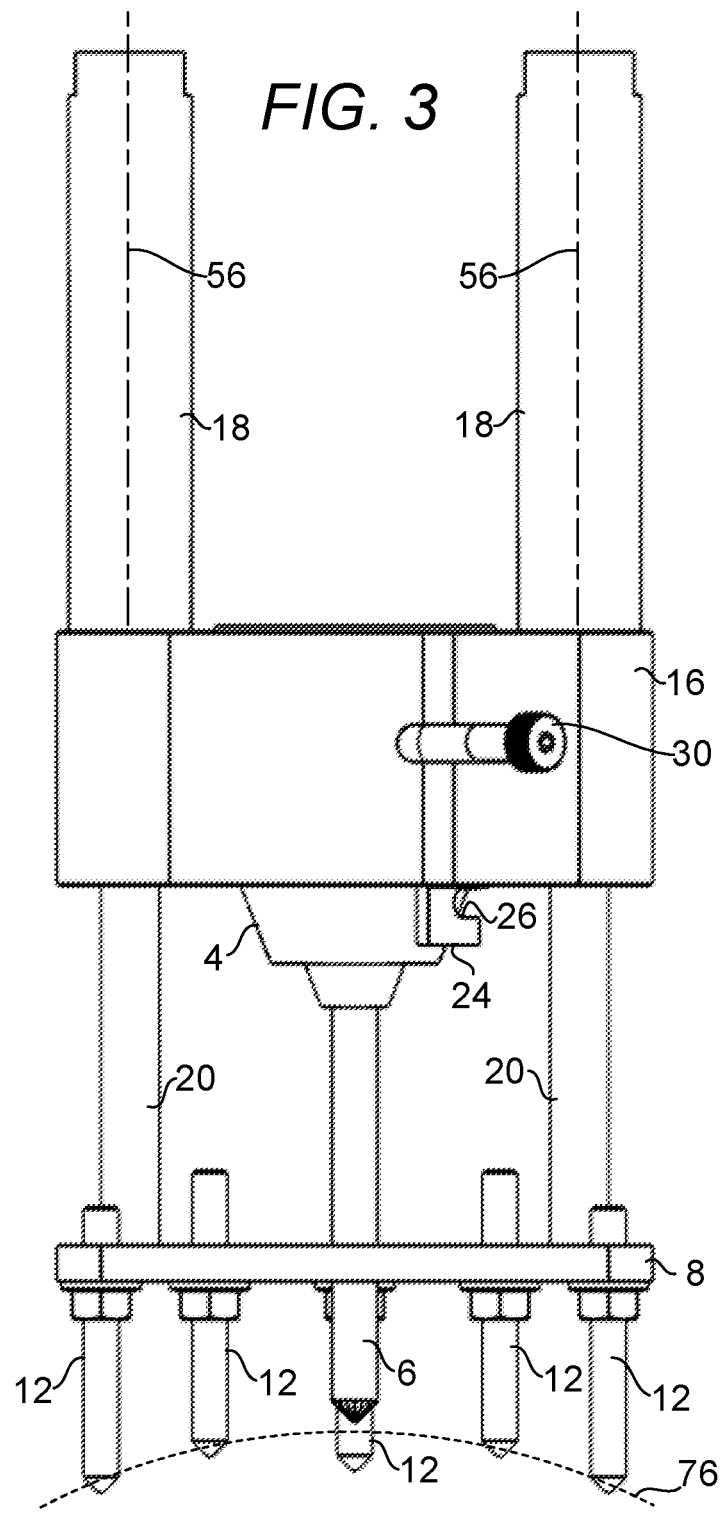
FIG. 3 is a top view of a device configured to be adaptable to a drill.
Figure 4:
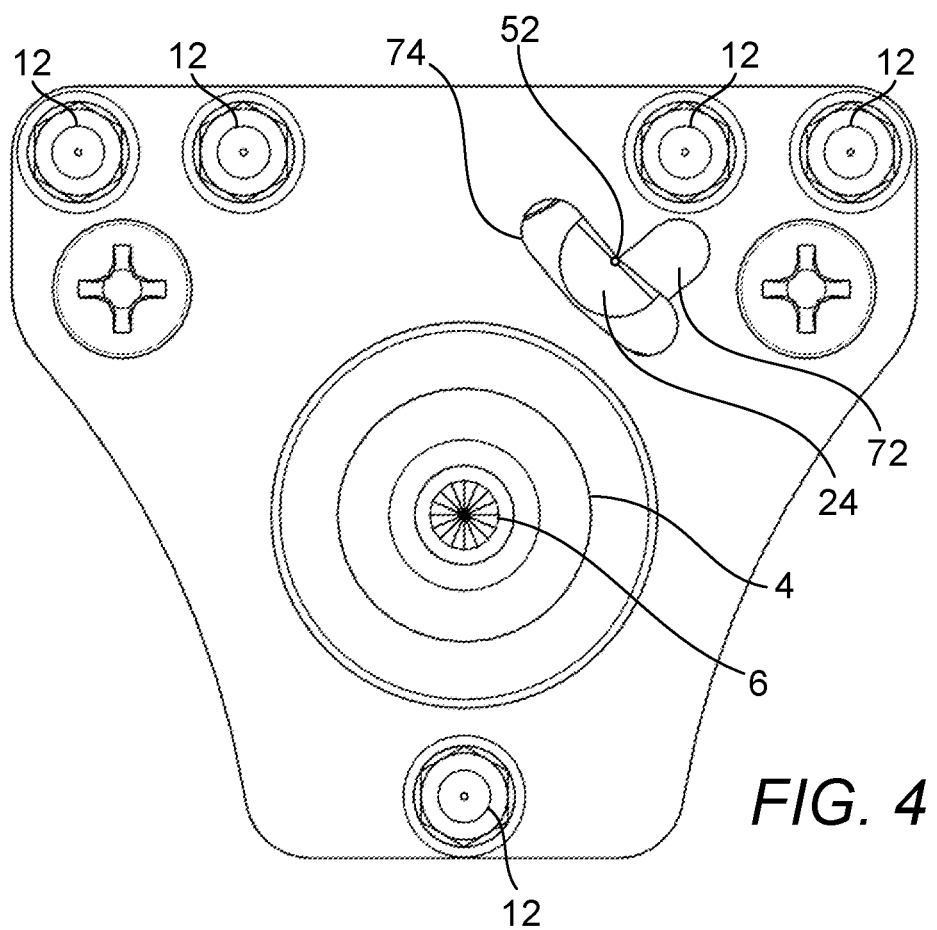
FIG. 4 is a front view of a device configured to be adaptable to a drill.
Figure 5:
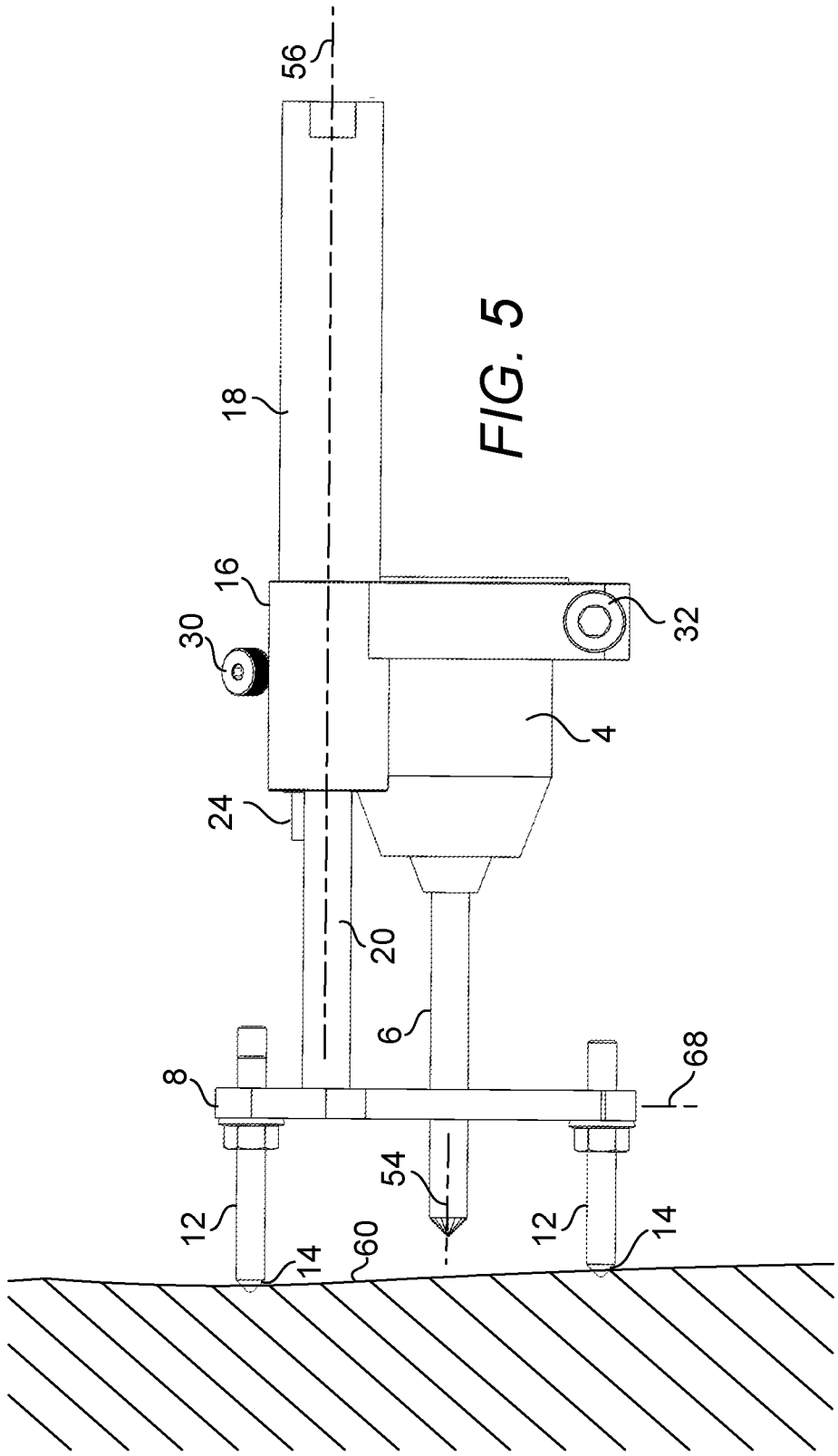
FIG. 5 is a side view of a device configured to be adaptable to a drill, depicting a front plate of the device being disposed in a second position.
Figure 6:
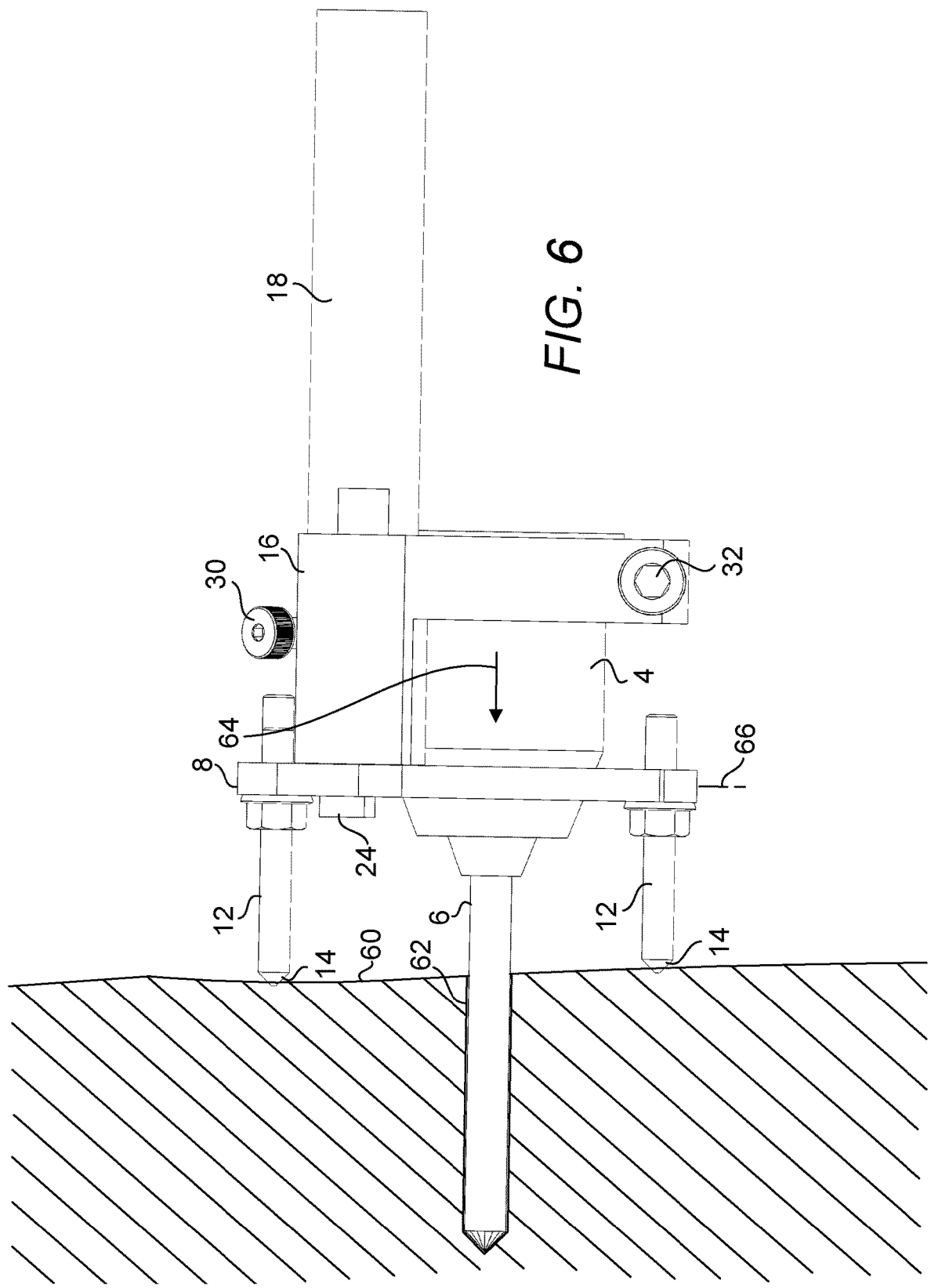
FIG. 6 is a side view of a device configured to be adaptable to a drill, depicting a front plate of the device being disposed in a first position.

FIG. 1 is a top front perspective view of a device 2 configured to be adaptable to a drill 4. FIG. 2 is a top rear perspective view of a device 2 configured to be adaptable to a drill 4. FIG. 3 is a top view of a device 2 configured to be adaptable to a drill 4. FIG. 4 is a front view of a device 2 configured to be adaptable to a drill 4. It shall be noted that, in these and the ensuing drawings, only a portion of a drill is shown. The device 2 is configured to be adapted to a drill 4. The drill 4 has a drill bit 6 and the drill bit 6 has a central axis 54. The device 2 includes an adjustable ring 16, a front plate 8, a plurality of pins 12 and at least one slide 18, e.g., as shown herein. The adjustable ring 16 is configured to be adapted to the drill 4 where the adjustable ring 16 is disposed at a proximal end of the device 2. In use, the adjustable ring 16 is slid over a stationary area of a suitable drill 4 just behind the chuck and secured to this area of the drill 4. A suitable drill is one which is hand-held and electrically-powered either with an electrical cord or with a portable battery. In the embodiment shown, the adjustable ring 16 is a split ring including an opening 58 sized sufficient to be slid over this area where the diameter of the opening 58 is configured to be adjustable by using a fastener 32, e.g., a screw, etc., which secures the two parts of the split ring 16 and can be tightened around the area, securing the ring 16 to the drill 4. The front plate 8 is disposed at a distal end of the device 2 and includes an aperture 10 through which the drill 4 is accommodated. The plurality of pins 12 are disposed on the front plate 8, each pin 12 including a tip 14, e.g., a pointed tip to provide grip while the pins 12 are engaging a tree trunk surface, e.g., tree bark. In the embodiment shown, each pin 12 is configured to be adjustable with respect to the front plate by using a screw and nut combination. Screw threads are disposed on each pin and matching threads are tapped in holes configured for receiving these pins in the front plate 8. Upon adjustment, each pin is secured in place by means of a nut. In this embodiment, two slides 18 are used, each having a central axis 56, although one slide may be sufficient. The use of more than one slide increases the ability of the device to resist the torque created while drilling, ultimately resulting in more precise holes that are drilled. A precise hole is defined as a dimensionally-predictable hole in which a spout fits well to allow sap collection without fail. The front plate 8 is configured to be retractable to a first position 66 as shown in FIG. 6 and extendable to a second position 68 as shown in FIG. 5. The adjustable ring 16 is attached to each slide 18 at a first portion of the slide 18 and the front plate 8 is attached to the slide 18 at a second portion of the slide and a distance between the tip of each pin 12 and the adjustable ring is configured to be adjustable by the slides 18 along the central axis 56 of the at least one slide 18. A slide can be a spring-loaded slide. In the embodiment shown, each slide is essentially a rod 20 configured to travel relative to a cylindrical housing. Within the cylinder, a head end of the rod 20 is disposed in a manner to contact one end of a mechanical spring. The travel of the rod relative to the cylinder is facilitated by a linear motion bearing 22 which also serves as a seal to prevent debris from getting into the cylinder, thereby promoting the longevity of the slide. Alternatively, a slide may include an air spring instead. An appropriate spring rate is selected to require an appropriate level of engagement force to be applied to the slide before the slide can be compressed. Care must be taken to allow a user to sense that the pins 12 have come in contact with a tree trunk and that the device 2 has properly engage it before the user continues to move the device towards the tree in direction 64 to compress the slides 18 to allow the drill to reach the tree trunk such that an elongated cylindrically-shaped hole 62 can be created before a spout can be subsequently inserted. Care must also be taken to ensure that the amount of force needed to compress the springs is sufficiently low for an average user.

The device further includes a lock configured for locking the slides 18 to substantially a first position. In this position, functions rendered by the device 2 for maple tree tapping is suppressed, allowing the drill to be used for purposes originally intended for the drill, e.g., for a broken spout or tap to be drilled out and removed. As such, while the device is attached to a drill, the drill can still be used for other purposes by simply disposing the device in the locked or first position or with the front plate out of the way of the drill bit. In the embodiment shown throughout the figures, it shall be noted that the lock is essentially a barrel rotatably housed in the body 16 where the barrel is capable of rotation about a central axis 52. A trigger 30 is attached to the barrel and disposed at a location of the device such that the barrel is operable by a user while holding the drill by rotating the barrel to an orientation where a block 24 disposed at one end of the barrel is disposed at an orientation with a latch 26 of the block 24 either engaging or disengaging a portion 72 of the front plate 8. A slot 28 made in the body 16 allows the trigger 30 to protrude from the body 16 such that it is accessible to the user. If the latch 26 is engaged with portion 72, the front plate 8 is locked in the first position. The front plate 8 can be released to resume its second position simply by removing this engagement.

FIG. 5 is a side view of a device configured to be adaptable to a drill, depicting a front plate 8 of the device being disposed in a second position 68 relative to the body 16. FIG. 6 is a side view of a device configured to be adaptable to a drill, depicting a front plate 8 of the device being disposed in a first position 66 relative to the body 16. In the position shown in FIG. 5, the device is ready to be used to drill an elongated hole in a maple tree having a surface 60. The device is positioned at a desired surface 60 through which an elongated hole is to be drilled with at least three of the tips 14 engaging the surface 60. Referring back to FIG. 3, it shall be noted that five pins are provided. The area encompassed by the engaging pins 12 are preferably as wide as possible for increased stability of the engagement. In other words, care should be taken to ensure that the pins 12 disposed on the periphery of the area should be adjusted to lengths sufficient to allow their engagements with the surface 60. The pins 12 disposed within the area of engagement delineated by the peripheral pins 12 are preferably adjusted to shorter lengths from the front plate 8 as shown in FIG. 3 to allow them to conform to a contour 76 of a tree trunk. Upon seating the pins 12 against a tree trunk as shown in FIG. 5, a user of the drill 4 can proceed to push the device towards the surface upon which an elongated hole is to be made as shown in FIG. 6. It shall be noted that as the slides 18 and the drill bit 6 are not coaxially disposed as evidenced in the central axis 54 of the drill that is not being coaxially disposed with any one of the central axes 56 of the slides 18, the device assumes an open structure with the bottom space of the drill largely uninhibited, eliminating any opportunity for the device to collect debris as in the case of a device with a cage-like structure.

Figure 7:
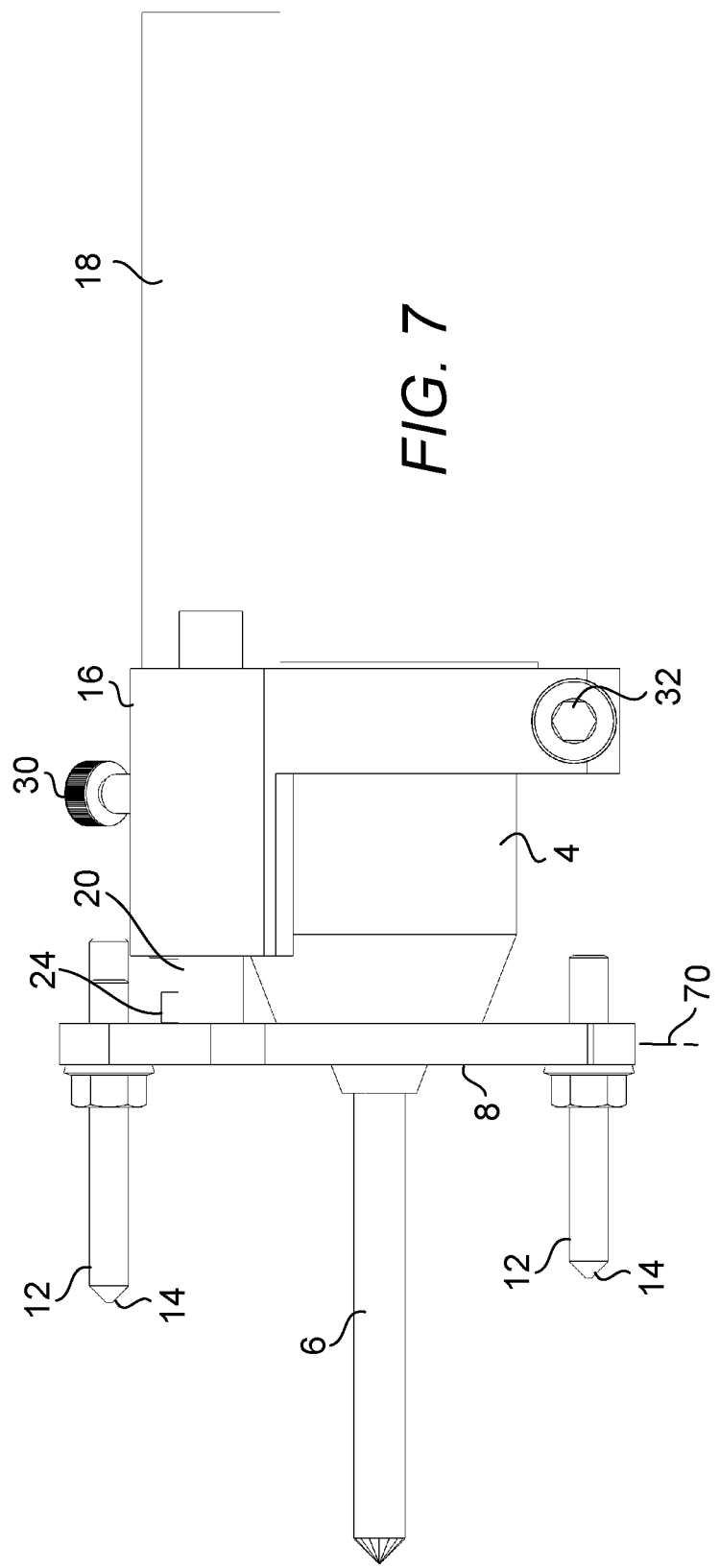
FIG. 7 is a side view of a device configured to be adaptable to a drill, depicting a front plate of the device being disposed in a third position.

FIG. 7 is a side view of a device configured to be adaptable to a drill, depicting a front plate 8 of the device being disposed in a third position 70 relative to the body 16. It shall be noted that the block 24 shown in FIG. 4 as being disposed in an opening 74 of the front plate 8 is now disposed at an orientation preventing the block 24 from being disposed in the opening 74, thereby creating an offset compared to the first position where the block 24 is disposed at least partially in the opening 74 to latch on to portion 72 of the front plate 8. It shall be noted that, in the embodiment shown throughout, the lock serves dual purposes, both as a lock and as a block to limit the retraction of the front plate 8 to a position that is different from first position, thereby providing an alternative position or drilling depth to the device.

Figure 8:
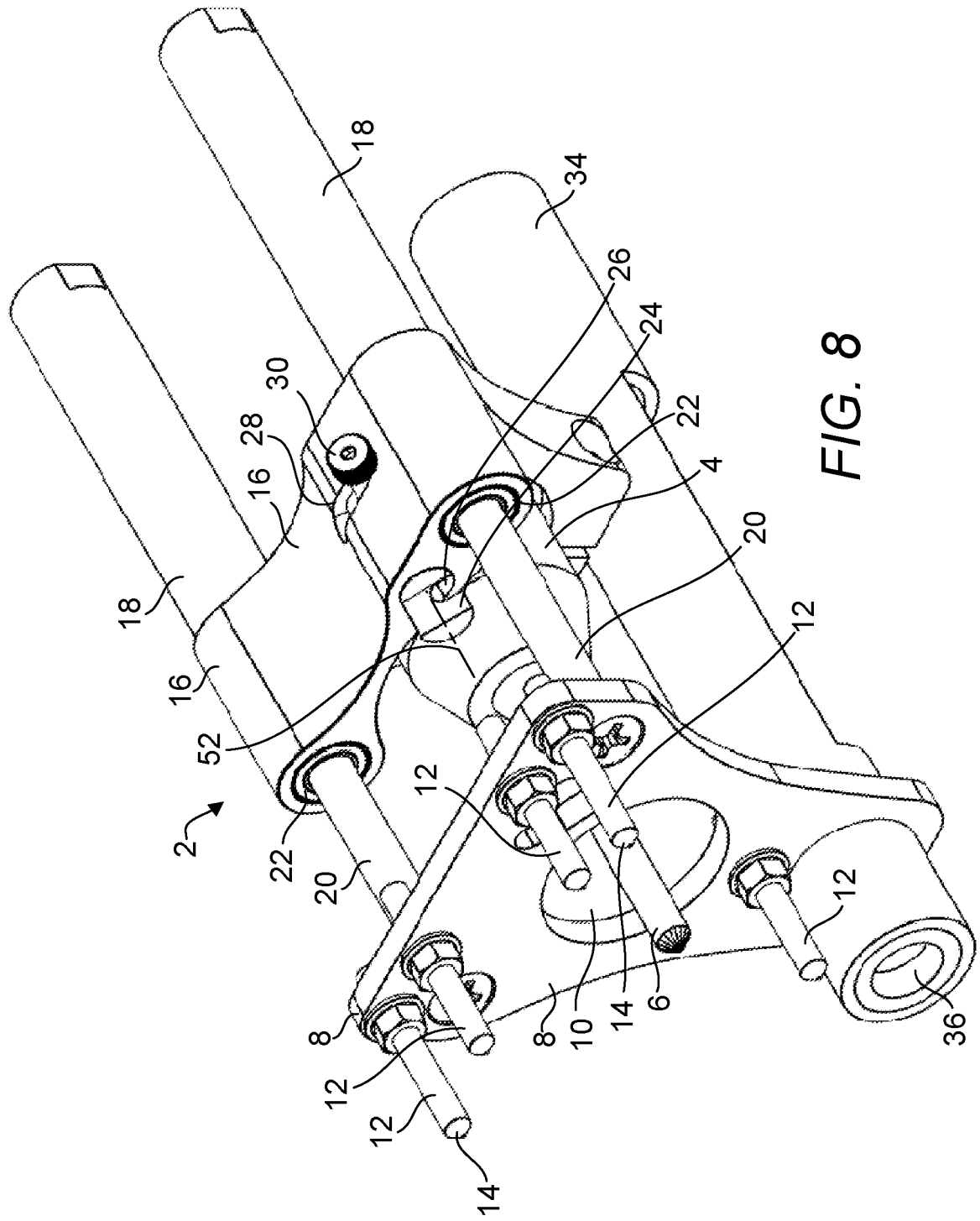
FIG. 8 is a top front perspective view of a device configured to be adaptable to a drill, depicting an additional tool useful for marking a tree at or around the same time the tree is drilled.

In some applications, maple trees are marked once they have been tapped to avoid tapping the same trees more than once in a maple-tapping season. Conventionally, the tapped maple trees are marked with some form of marker, e.g., paint in a process separate from the tapping activity. FIG. 8 is a top front perspective view of a device configured to be adaptable to a drill, depicting an additional tool useful for marking a tree at or around the same time the tree is drilled. Here, the device further includes a paint marker 34 configured to mark a portion of the surface at a moment a drill is pushed against the surface to be drilled. As the device is pushed against a surface to be drilled, a paint marker tip 36 of the paint marker 34 approaches the surface and eventually making contact with the surface to mark the surface with some paint. In this embodiment, as the device includes both a tapping tool and a marker, the process of tapping each tree using this device includes drilling and marking of the tree simultaneously, eliminating the need to mark the tree separately.

Figure 9:
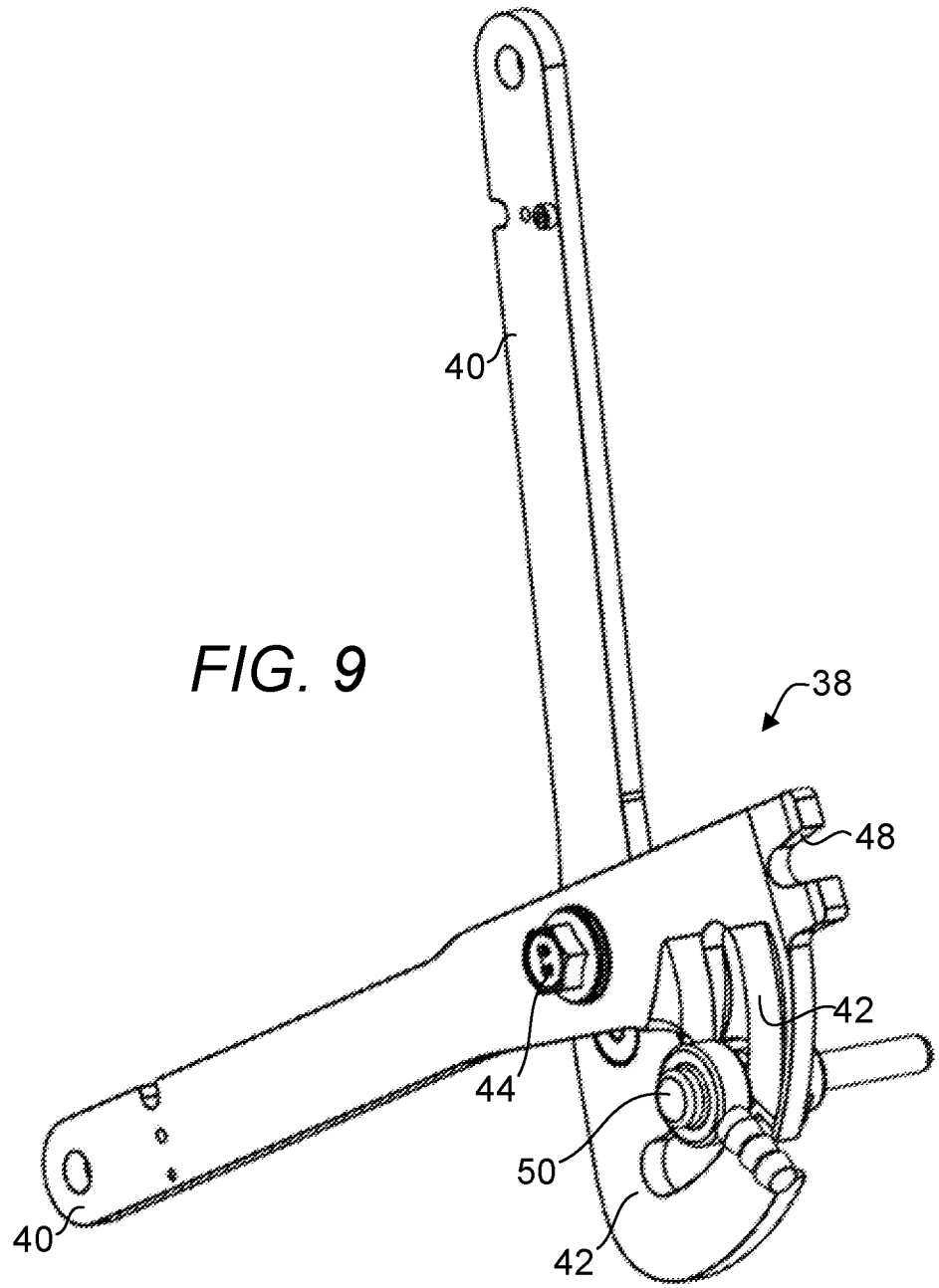
FIG. 9 is a top front perspective view of a second device useful for maintenance related to the tapping of a maple tree, depicting the second device being disposed in a position to sever a spout in preparation for its replacement with a new spout.
Figure 10:
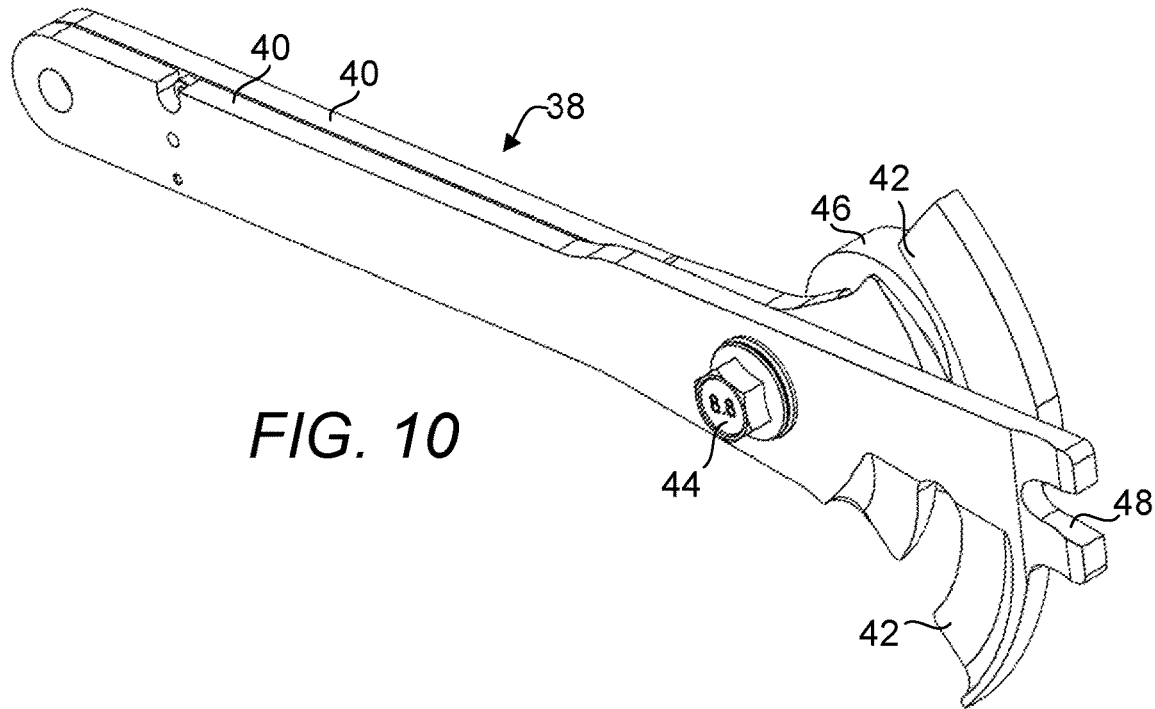
FIG. 10 is a top front perspective view of the second device of FIG. 9 disposed in a manner such that it is useful as a hammer or a claw.
Figure 11:
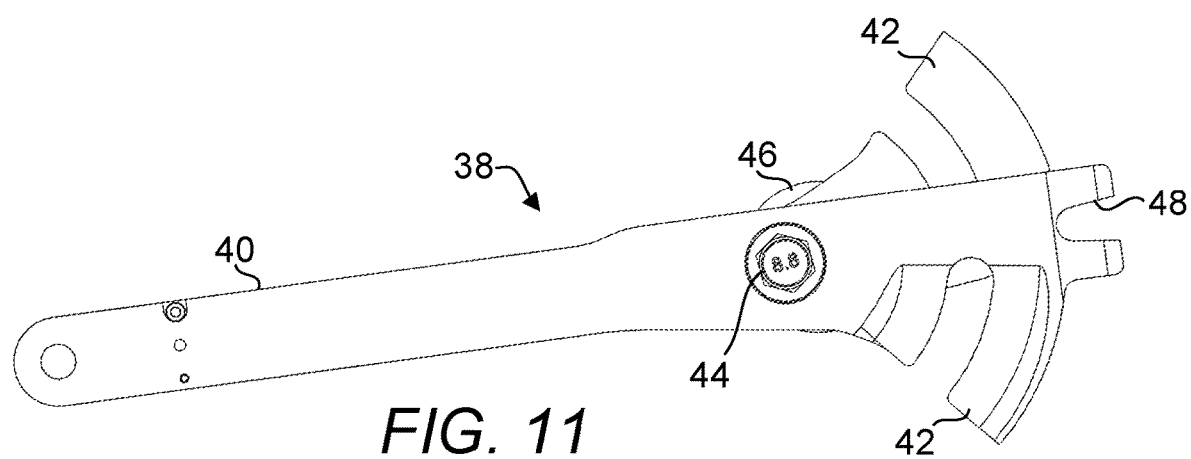
FIG. 11 is a side view of the second device of FIG. 9 disposed in a manner such that it is useful as a hammer or a claw.
Figure 12:
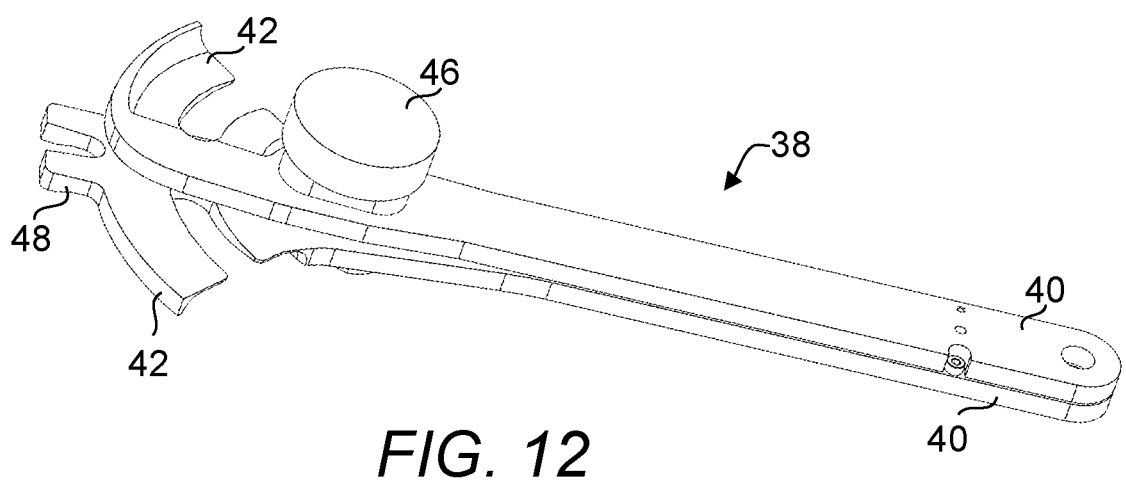
FIG. 12 is a bottom rear perspective view of the second device of FIG. 9 disposed in a manner such that it is useful as a hammer or a claw.

Upon setting up a tap for a maple tree, maintenance of the tap is required at a later time. At the beginning of each tapping season, the part of a spout that was inserted into a tree is replaced to ensure proper sanitation of the tap hole. A used spout can put contaminants in the tree that greatly affect sap production. In solving this problem, a combination of a spout adaptor and a stubby spout is used. A spout adaptor is the part inserted into a tree and the stubby spout remains on a line connected to a collection system. It is very difficult to separate the two parts, causing many maple syrup producers to avoid the two-part system. Further disclosed herein is a second device 38 useful for separating spout parts, e.g., used, non-functioning or non-productive spout parts to make the two-part system more user friendly. The device 38 is useful for easily separating the two parts of this spout system by wedging them apart. It is also configured to be used for replacing the spout right before tapping, in which a hammer would be optimal to pair with the separator as one would first separate an old spout adaptor from the stubby spout and then replace it with a new one, using the same tool to then tap it into a new hole drilled in a tree. This device is also suitable for use to separate the two parts and to remove an old adaptor at the end of a tapping season by pulling the spout out of the tree into which the spout has been inserted. In this case, a claw of the device is used to pry out the old spout before or after the two parts have been separated. FIG. 9 is a top front perspective view of a second device useful for maintenance related to the tapping of a maple tree, depicting the second device being disposed in a position to separate parts of a spout in preparation for its replacement with a new spout. FIG. 10 is a top front perspective view of the second device of FIG. 9 disposed in a manner such that it is useful as a hammer or a claw 48. FIG. 11 is a side view of the second device of FIG. 9 disposed in a manner such that it is useful as a hammer or a claw 48. FIG. 12 is a bottom rear perspective view of the second device of FIG. 9 disposed in a manner such that it is useful as a hammer or a claw 48. The second device is essentially a single device useful for removing and/or replacing a part of a spout. To facilitate the replacement of the part, the spout may not need to be removed in its entirety. In one example, a part of a spout 50 may be partially removed by separating its tip as shown in FIG. 9. The second device includes a pair of spreaders pivotably secured at a pivot point 44. Each spreader includes a jaw 42 connected to a shank 40. For separating a spout, the shanks 40 are spread sufficiently far apart so that the spreader head formed from the spreaders 42 can surround the tip of the spout 50 before the shanks are closed such that spreaders 42 slide against each other. A claw 48 useful for prying the portion of the spout left in a tap upon, is configured to extend from one of the spreader 42. A hammer head or striker 46 is configured to be attached to one of the spreaders 42, again providing an additional function to the second device. In one instance, a hammer is useful for more securely inserting a new spout or a replacement spout part. As the shanks are disposed in their closed positions upon spreading parts of the spout, the shanks together serve as a handle for the second device to be used as a claw or a hammer.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A tree-tapping tool configured to be adapted to a hand-held drill to transform the hand-held drill for drilling an elongated hole with consistent diameters in a tree to receive a spout, the hand-held drill having a drill bit and the drill bit having a central axis, said tree-tapping tool comprising:

(a) an adjustable ring configured to be adapted to the drill, said adjustable ring disposed at a proximal end of said tree-tapping tool, wherein said adjustable ring comprises a split ring comprising an opening diameter configured to be adjustable by using a fastener;

(b) a front plate disposed at a distal end of the said tree-tapping tool;

(c) a plurality of pins disposed on said front plate, each said plurality of pins comprising a tip, wherein said front plate comprises an upper side and a lower side, the drill bit disposed between said upper side and said lower side, a greater number of said plurality of pins is disposed on one of said upper side and said lower side than the other one of said upper side and said lower side such that said plurality of pins are disposed on a periphery of a triangular-shaped area of said front plate, said triangular-shaped area comprises three vertices, at least one of said plurality of pins is disposed on two of said three vertices and only one of said plurality of pins is disposed on one of said three vertices; and (d) at least one slide comprising a central axis, said front plate configured to be retractable to a first position and extendable to a second position, said adjustable ring is attached to said at least one slide at a first portion of said at least one slide and said front plate is attached to said at least one slide at a second portion of said at least one slide and a distance between said tip of each of said plurality of pins and said adjustable ring is configured to be adjustable by said at least one slide along said central axis of said at least one slide, wherein said adjustable ring is connected to said at least one slide such that the central axis of the drill bit is parallel to said central axis of said at least one slide and the central axis of the drill bit is not coaxial with said central axis of said at least one slide and at least one of said tips of said plurality of pins comes in contact with a surface before the drill is pushed against the surface through said triangular-shaped area to compress said at least one slide, guiding the drill bit against the surface.

2. The tree-tapping tool of claim 1, wherein said at least one slide comprises at least two slides.

3. The tree-tapping tool of claim 1, wherein said at least one slide comprises a cylinder.

4. The tree-tapping tool of claim 1, further comprising a lock configured for locking said at least one slide to substantially said first position to immobilize said front plate with respect to said adjustable ring.

5. The tree-tapping tool of claim 4, wherein said lock further comprises a trigger disposed at a location of said tree-tapping tool such that said lock is operable by a user while holding the drill.

6. The tree-tapping tool of claim 1, further comprising a block configured to selectively block said front plate while said front plate is being retracted such that said front plate is configured to be retractable to a third position instead, wherein said third position is different from said first position.

7. The tree-tapping tool of claim 1, wherein said at least one slide comprises at least one spring-loaded slide comprising a spring disposed therein.

8. The tree-tapping tool of claim 1, wherein at least one of said plurality of pins is configured to be adjustable with respect to said front plate.

9. The tree-tapping tool of claim 1, wherein said at least one slide comprises a linear motion bearing.

10. The tree-tapping tool of claim 1, further comprising a paint marker configured to mark a portion of the surface at a moment the drill is pushed against the surface.

11. A tree-tapping tool configured to be adapted to a drill, the drill having a drill bit and the drill bit having a central axis, said tree-tapping tool comprising:
   (a) an adjustable ring configured to be adapted to the drill, said adjustable ring disposed at a proximal end of said device;
   (b) a front plate disposed at a distal end of the said tree-tapping tool;
   (c) a plurality of pins disposed on said front plate, each said plurality of pins comprising a tip;
   (d) at least one slide comprising a central axis, said front plate configured to be retractable to a first position and extendable to a second position, said adjustable ring is attached to said at least one slide at a first portion of said at least one slide and said front plate is attached to said at least one slide at a second portion of said at least one slide and a distance between said tip of each of said plurality of pins and said adjustable ring is configured to be adjustable by said at least one slide along said central axis of said at least one slide; and
   (e) a lock comprising an opening disposed in said front plate, a block comprising a latch, said block is configured to be rotatably connected to said adjustable ring about a second axis and in alignment with said opening along said second axis, and a lever fixedly connected to said block, wherein said lock is configured for locking said at least one slide to substantially said first position to immobilize said front plate with respect to said adjustable ring to be disposed in said first position in a first mode of operation of the drill by compressing said at least one slide until said block is disposed through said opening before the block is rotated about said second axis by rotating said lever such that said latch engages said front plate,
wherein said adjustable ring is connected to said at least one slide such that the central axis of the drill bit is parallel to said central axis of said at least one slide and the central axis of the drill bit is not coaxial with said central axis of said at least one slide, at least one of said tips of said plurality of pins comes in contact with a surface before the drill is pushed against the surface to compress said at least one slide, guiding the drill bit against the surface in a second mode of operation of the drill.

12. The tree-tapping tool of claim 11, wherein said adjustable ring is a split ring comprising an opening diameter configured to be adjustable by using a fastener.

13. The tree-tapping tool of claim 11, wherein said at least one slide comprises at least two slides.

14. The tree-tapping tool of claim 11, wherein said at least one slide comprises a cylinder.

15. The tree-tapping tool of claim 11, wherein said lock further comprises a trigger disposed at a location of said device such that said lock is operable by a user while holding the drill.

16. The tree-tapping tool of claim 11, further comprising a block configured to selectively block said front plate while said front plate is being retracted such that said front plate is configured to be retractable to a third position instead, wherein said third position is different from said first position.

17. The tree-tapping tool of claim 11, wherein said at least one slide comprises a linear motion bearing.

18. The tree-tapping tool of claim 11, further comprising a paint marker configured to mark a portion of the surface at a moment the drill is pushed against the surface.

* * * * *